United States Patent
Sano

(10) Patent No.: US 8,690,719 B2
(45) Date of Patent: Apr. 8, 2014

(54) PUSH TYPE DRIVING BELT

(75) Inventor: Toshinari Sano, Shizuoka (JP)

(73) Assignee: Toyota Jidosha Kabushiki Kaisha, Aichi (JP)

(*) Notice: Subject to any disclaimer, the term of this patent is extended or adjusted under 35 U.S.C. 154(b) by 294 days.

(21) Appl. No.: 13/002,255

(22) PCT Filed: Nov. 20, 2009

(86) PCT No.: PCT/JP2009/069696
§ 371 (c)(1),
(2), (4) Date: Dec. 30, 2010

(87) PCT Pub. No.: WO2011/061850
PCT Pub. Date: May 26, 2011

(65) Prior Publication Data
US 2011/0237376 A1    Sep. 29, 2011

(51) Int. Cl.
*F16G 1/22*    (2006.01)
*F16G 5/16*    (2006.01)

(52) U.S. Cl.
USPC ........................................... 474/242; 474/237

(58) Field of Classification Search
USPC ......... 474/166, 167, 174, 237, 240, 242, 244, 474/246, 260, 261, 262, 266, 271, 273
See application file for complete search history.

(56) References Cited

U.S. PATENT DOCUMENTS

| | | | | |
|---|---|---|---|---|
| 2,985,222 | A | * | 5/1961 | Marty et al. ................. 474/252 |
| 3,720,113 | A | * | 3/1973 | Marty et al. ................. 474/242 |
| 4,612,005 | A | * | 9/1986 | Miranti, Jr. .................. 474/201 |
| 5,242,332 | A | * | 9/1993 | Douhairet et al. ............ 474/146 |
| 6,306,055 | B1 | * | 10/2001 | Serkh ........................... 474/242 |
| 6,612,954 | B2 | | 9/2003 | Akagi et al. |
| 6,896,633 | B2 | * | 5/2005 | Kanehara ..................... 474/242 |
| 2003/0040387 | A1 | * | 2/2003 | Kanehara ..................... 474/242 |
| 2009/0203478 | A1 | * | 8/2009 | Kobayashi .................... 474/242 |
| 2010/0311531 | A1 | * | 12/2010 | Nishimi et al. ............... 474/242 |
| 2011/0201467 | A1 | * | 8/2011 | Kobayashi .................... 474/240 |

FOREIGN PATENT DOCUMENTS

| | | |
|---|---|---|
| JP | 57-102745 U | 6/1982 |
| JP | 59-77643 U | 5/1984 |
| JP | 01-312247 A | 12/1989 |
| JP | 04-219547 A | 8/1992 |
| JP | 11-082638 A | 3/1999 |
| JP | 2001-317594 A | 11/2001 |
| JP | 2002-168305 A | 6/2002 |
| JP | 3406283 B2 | 5/2003 |

* cited by examiner

*Primary Examiner* — Sang Kim
*Assistant Examiner* — Juan Campos, Jr.
(74) *Attorney, Agent, or Firm* — Sughrue Mion, PLLC

(57) ABSTRACT

To provide a push type driving belt, which is capable of preventing uneven wear of the ring and deterioration in durability of the ring, by preventing a transmission loss resulting from an internal slippage of the ring, and by positioning the ring properly with respect to the element.

The push-type driving belt B comprises: an element 1, in which a recess 8 opening toward a diametrically outer circumferential side is formed in a width center thereof; and a ring 9, which is formed of single layer in its thickness direction using elastic material, and which is fitted into the recess 8 of the element 1 to fasten the elements 1 juxtaposed in a circular manner. In the push-type driving belt B, inclined faces 13 and 14 are formed on side faces 9a and 9b of the ring 9 plane symmetrically across a width center plane C; and contact faces 15 and 14 each inclination thereof is identical to that of the inclined faces 13 and 14 and each area thereof is smaller than that of the inclined face 13 and 14 are formed on the inner wall 6a and 7a of width end of the recess 8.

8 Claims, 7 Drawing Sheets

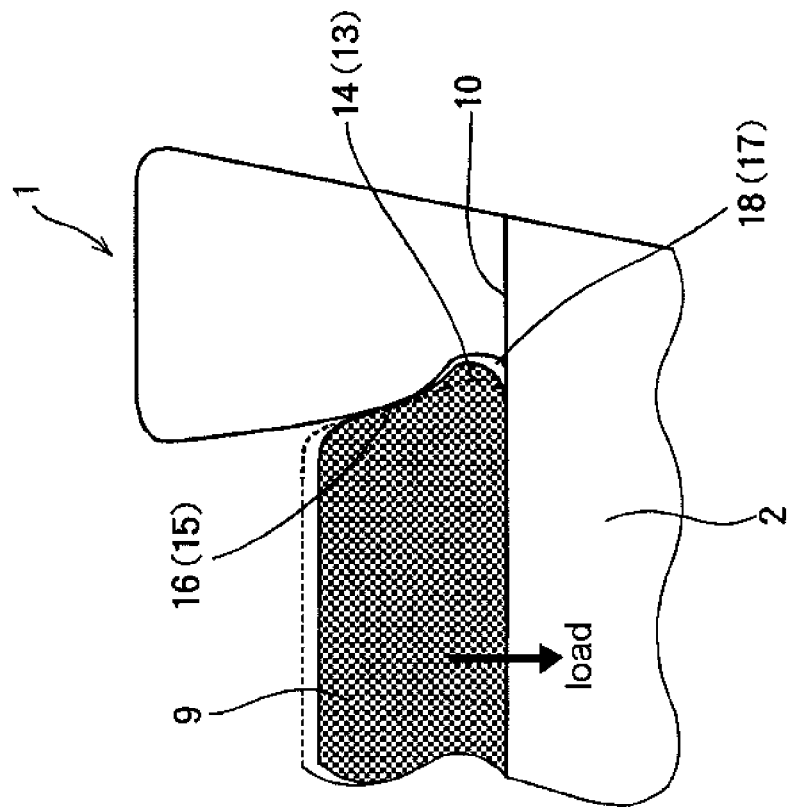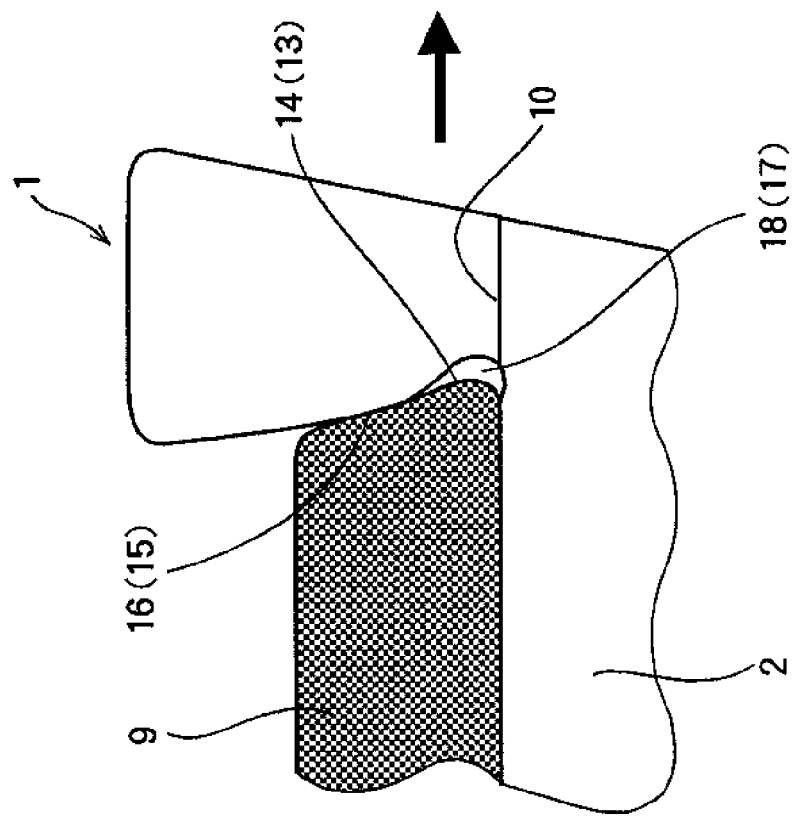
FIG. 5

PUSH TYPE DRIVING BELT

TECHNICAL FIELD

This invention relates to a driving belt, which is formed by annularly juxtaposing a plurality of plate elements in which a recess for holding a ring therein is formed in a width center thereof, and by fastening the elements in a circular manner using a ring. More specifically, the present invention relates to a push type driving belt, which is configured to transmit a torque between two pulleys by pushing the elements sequentially by the following elements.

BACKGROUND ART

A push type driving belt is known in the prior art to be used as a power transmission belt in a belt type continuously variable transmission. In general, the push type driving belt is formed by annularly juxtaposing a plurality of plate member called an "element" or a "block" in a same orientation, and by fastening the juxtaposing plate members by an annular member called a hoop or band to be called a "ring" hereinafter). Side faces of the element are inclined to serve as flank faces to be fit with a V-shaped groove of the pulley. Therefore, the flank faces thus formed are contacted with a surface of the V-shaped groove, and a torque is transmitted at the contact portion between the element and the pulley.

When the driving belt thus structured is clamped by the pulley, a force is applied to the element in the direction to push the element toward an outer circumferential side. Consequently, the ring fastening the element is strained. In this situation, when a driving pulley is driven by a torque, the ring thus clamped by the driving pulley is driven together with the driving pulley. Since the driving belt is applied to the driving pulley and the driven pulley, the elements in a straight region between the drive and driven pulleys are pushed by the elements sequentially pushed out of the drive pulley. The elements thus pushed in the straight region are then pushed into the V-groove of the driven pulley sequentially to be rotated together with the driven pulley. That is, the driven pulley is rotated by the element thus pushed into the V-groove by the following elements. Consequently, the torque is transmitted from the drive pulley to the driven pulley.

An example of the push type driving belt is disclosed in a publication of Japanese patent No. 3406283. Specifically, the belt for continuously variable transmission taught by Japanese patent No. 3406283 comprises a metal ring assembly formed of a plurality of endless metal rings laminated one on another, and a large number of metal elements each having a ring slot into which said metal ring assembly is fitted. The belt taught by Japanese patent No. 3406283 is applied to a drive pulley and a driven pulley to transmit the torque between those pulleys. According to the teachings of Japanese patent No. 3406283, the metal rings and a saddle face of the ring slot supporting the innermost metal ring each have a crowning, and a crowning radius of the metal rings is set smaller than a crowing radius of the saddle face.

Another example of the driving belt is disclosed in Japanese Patent Laid-Open No. 01-312247. Specifically, Japanese Patent Laid-Open No. 01-312247 discloses a transmission device with pushout type lateral link for continuously variable transmission (i.e., a driving belt). The driving belt taught by Japanese Patent Laid-Open No. 01-312247 comprises at least one endless flexible connecting element (i.e., a ring) which is quasi-inextensible longitudinally, and a non-metallic transverse link having a groove to hold the ring. According to the teachings of Japanese Patent Laid-Open No. 01-312247, a friction between the ring and an inner walls erected on both sides of the saddle face is reduced by coating the ring by a resin with a low coefficient of friction. In addition, according to the teachings of Japanese Patent Laid-Open No. 01-312247, the non-metallic ring is formed of elastomer or rubber.

Meanwhile, Japanese Patent Laid-Open No. 2001-317594 discloses a thin metallic ring of metallic belt. According to the teachings of Japanese Patent Laid-Open No. 2001-317594, the thin metallic ring assembly is formed by overlapping a plurality of thin metallic in its thickness direction, and the thin metallic ring assembly thus formed is used to form a metallic belt (i.e., a driving belt) together with a plurality of blocks (i.e., elements). According to the metallic belt taught by Japanese Patent Laid-Open No. 2001-317594, in order to reduce a stress generated at a contact portion between a pulley and the ring, a curved surface is formed on a portion of the inmost ring to be contacted with the pulley.

In addition, Japanese Patent Laid-Open No. 2002-168305 discloses an element for continuously variable transmission belt. Specifically, the element taught by Japanese Patent Laid-Open No. 2002-168305 is a plate-like element to be used to form a continuously variable transmission belt together with a band ring. The element taught by Japanese Patent Laid-Open No. 2002-168305 comprises a body part having a saddle face to which the ring abuts, and a pillar part extending from the saddle face. According to the teachings of Japanese Patent Laid-Open No. 2002-168305, a curved face is formed on the saddle face to extend circularly in the cross direction of the belt. In order to distribute a stress at a contact portion between the ring and the element, the curved face comprises a main face of a curvature radius Ra to which the ring mainly abuts, and an end face of a curvature radius Rb formed on the pillar side of the main face.

The push type driving belt, for example, the belt taught by Japanese patent No. 3406283 is generally used in a transmission mechanism requiring a comparatively large torque transmission capacity such as a belt type continuously variable transmission. Therefore, the metal ring of the push type driving belt is required to have two contradicting characteristics, such as: a sufficient strength or hardness to fasten the element in a circular manner; and flexibility or bendability to be applied to the pulleys smoothly. In order to fulfill the above-explained requirements, the metal ring assembly of the driving belt of Japanese patent No. 3406283, a layered ring 100 shown in FIG. 7 formed by overlapping a plurality of single layered thin metal ring 101 and so on are used in the prior art. The ring thus formed has not only a high strength but also flexibility.

As described, the driving belt according to Japanese patent No. 3406283 comprises the crowning on the saddle face of the element. Therefore, the ring is positioned at the center of the saddle face by frictional force acting between the saddle face and the innermost surface of the ring when the driving belt is driven. Accordingly, a side end face of the ring can be prevented from being contacted with a neck portion or a column of the element, or a V-groove of the pulley. For this reason, according to the teachings of Japanese patent No. 3406283, uneven wear of the ring and deterioration in durability of the ring can be prevented.

However, in case of using the metal ring assembly of Japanese patent No. 3406283 or the layered ring 100 in the driving belt, a slippage between the singly layered rings will occur inevitably when the driving belt is driven to transmit the power. Therefore, power transmission efficiency of the driving belt has to be degraded by such internal slippage of the layered ring.

On the other hand, according to the driving belt taught by Japanese Patent Laid-Open No. 01-312247, the ring is formed of elastic material such as rubber, resin etc. Therefore, according to the teachings of Japanese Patent Laid-Open No. 01-312247, a single layered flexible and monolithic ring can be formed, and the ring thus formed can be applied to the pulley smoothly. The above-explained internal slippage of the metallic layered ring can be prevented by using the single layered monolithic ring. Therefore, according to the driving belt taught by Japanese Patent Laid-Open No. 01-312247, a transmission loss resulting from the internal slippage of the ring can be avoided.

However, although the ring thus formed of the elastic material such as resin and rubber has an appropriate flexibility, the hardness thereof is relatively lower than that of the metallic ring. Therefore, in this case, a load derived from a tension of the ring or the like may be applied to the saddle face of the element unevenly. For example, in case of fastening the elements of Japanese patent No. 3406283 having the crowning on the saddle face using the ring made of rubber or resin whose hardness is relatively low, a frictional force acting between the saddle face of the element and the innermost surface of the ring has to be unstable. Therefore, the ring may not be positioned in the center of the element accurately.

Thus, in order to prevent uneven wear of the ring and deterioration in durability of the ring by avoiding a transmission loss resulting from an internal slippage of the ring while positioning the ring properly with respect to the element, it is necessary to improve the conventional push type driving belt, which is formed by fastening the metallic elements in a circular manner, and which is capable of transmitting comparatively large torque.

DISCLOSURE OF THE INVENTION

The present invention has been conceived noting the technical problems thus far described, and its object is to provide a push-type driving belt, which is capable of preventing uneven wear of a ring and deterioration in durability of the belt, by preventing a transmission loss resulting from a slippage of the ring, and by positioning the ring accurately with respect to an element.

In order to achieve the above-mentioned object, according to the present invention, there is provided a push-type driving belt, comprising: a plurality of plate elements, in which a recess opening toward a diametrically outer circumferential side of the belt is formed in a width center thereof; and a flat ring, which is formed of single layer in its thickness direction using elastic material, and which is fitted into the recess of the element to fasten the elements juxtaposed in a circular manner; characterized in that: an inclined face is formed on each of a side face of the ring plane symmetrically across a width center plane of the belt; and a contact face whose inclination is identical to that of the inclined face and whose area is smaller than that of the inclined face, or a contact curved face in which an inclination of a facing surface thereof is identical to that of the inclined face and whose area is smaller than that of the inclined face, is formed on each of the inner wall of width end of the recess.

According to another aspect of the present invention, there is provided a push-type driving belt, comprising: a plurality of plate elements, in which a recess opening toward a diametrically outer circumferential side of the belt is formed in a width center thereof; and a flat ring, which is formed of single layer in its thickness direction using elastic material, and which is fitted into the recess of the element to fasten the elements juxtaposed in a circular manner; characterized in that: an inclined face is formed on each of an inner wall of width end of the recess plane symmetrically across a width center plane of the belt; and a contact face whose inclination is identical to that of the inclined face and whose area per thickness of the element is smaller than that of the inclined face, or a contact curved face in which an inclination of a facing surface thereof is identical to that of the inclined face and whose area per thickness of the element is smaller than that of the inclined face, is formed on each of a side face of the ring.

Specifically, the inclined faces are inclined in a manner to increase a distance therebetween across the width center plane from a diametrically outer circumferential side toward a diametrically inner circumferential side of the belt.

According to the present invention, the push-type driving belt further comprises a relief area, which is formed on the inner wall, and in which an expanded portion of the ring is housed in case the ring is elastically deformed to be expanded widthwise.

Thus, according to the present invention, the driving belt is formed by fastening the element by the ring, and the ring is a monolithic annular member which is formed into a single layer in its thickness direction and which is formed of elastic material the hardness thereof is lower than that of the element. Therefore, transmission loss resulting from an internal slippage of the ring will not occur even if the driving belt is driven, unlike the conventional layered ring formed by overlapping a plurality of thin belt members. For this reason, power transmission efficiency of the driving belt can be improved.

As described, according to the present invention, the inclined faces are formed individually on the side faces of the ring. Therefore, the cross section of the ring is a laterally symmetrical trapezoidal shape. On the other hand, the contact faces or the contact curved faces to be contacted with the inclined faces of the ring are formed individually on the inner side walls of the recess of the element holding the ring therein. Alternatively, the inclined faces are formed individually on the inner side walls of the recess of the element. Therefore, the recess is formed into a laterally symmetrical trapezoidal shape. On the other hand, the contact faces or the contact curved faces to be contacted with the inclined faces of the recess is formed individually on the side faces of the ring. Therefore, according to the present invention, the ring held in the recess of the element is positioned at the width center of the recess by the inclined faces. In addition, the contact area between the inclined face and the contact face or the contact curved face is smaller than the area of the inclined face. Therefore, the ring can be prevented from being contacted with the inner wall of the recess unevenly only at one of the side faces thereof, that is, a load will not be applied to only one of the side faces of the ring. For this reason, a frictional loss at the contact portion between the side face of the ring and the inner wall of the element can be prevented or avoided, and the ring will not be worn only at one of the side faces thereof.

As also described, according to the present invention, the inclined faces are formed in a manner to widen the distance therebetween from the diametrically outer circumferential side of the belt toward the diametrically inner circumferential side of the belt. That is, the opening width of the recess is narrower than the width of the recess at the diametrically inner circumferential side. Therefore, the ring can be prevented from being detached from the element so that the driving belt can be formed firmly by fastening the elements by the ring.

In addition, according to the present invention, even if the ring is deformed elastically to be expanded widthwise by a load resulting from driving the belt, the expanded portion of the ring is housed in the relief area formed on the inner wall of the recess. Therefore, the contact load between the side face of the ring and the inner wall of the recess will not be increased even if the ring is deformed by the load. For this reason, a frictional loss at the contact portion between the side face of the ring and the inner wall of the element can be prevented or avoided, and the ring will not be worn only at one of the side faces thereof.

BRIEF DESCRIPTION OF THE DRAWINGS

FIG. 5 is an enlarged view showing the relief area of the push type driving belt according to the present invention.

BEST MODE FOR CARRYING OUT THE INVENTION

Figure 1:
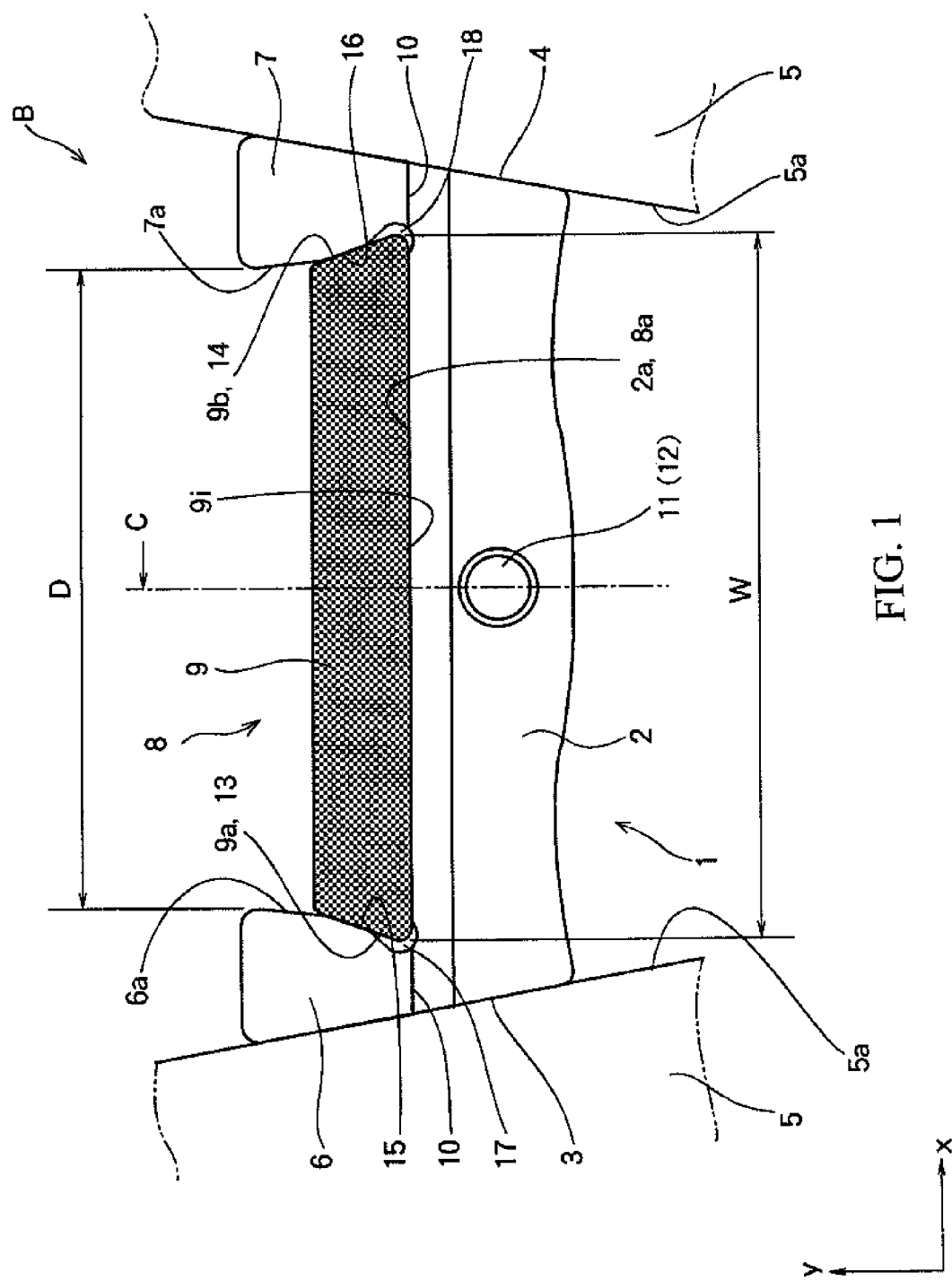
FIG. 1 is a front sectional view showing an example of a structure of the element and a cross section of the ring forming the push type driving belt according to the present invention.

Next, the present invention will be explained in more detail with reference to the accompanying figures. First of all, a structure of the push type driving belt B of the present invention will be explained with reference to FIGS. 1 and 2. For example, the push type driving belt B is applied to a drive pulley (i.e., an input shaft pulley) and a driven pulley (i.e., an output shaft pulley) of a belt-type continuously variable transmission for the purpose of transmitting a torque between those pulleys. According to the present invention, an element 1 is a plate member made of metal, for example. The element 1 comprises a main body (or a base portion) 2, and both side faces 3 and 4 formed on width ends (i.e., in the direction of x-axis in FIG. 1) of the main body 2 are inclined or tapered. The side faces 3 and 4 thus inclined are contacted frictionally with a (V-shaped) groove 5a of a pulley 5 to transmit the torque.

Columns 6 and 7 are erected on the width ends of the main body 2 to extend in a vertical direction of the element 1 (i.e., in the direction of y-axis in FIG. 1). Therefore, a recess 8 is formed by an upper end face 2a formed on an upper edge (in FIG. 1) of the main body 2, and inner walls 6a and 7a of the columns 6 and 7 facing to a width center of the main body 2. Thus, the recess 8 opens upwardly of the element 1, that is, opens toward an outer circumferential side of the driving belt B.

A flat ring 9 is fitted into in the recess 8 for the purpose of fastening the elements 1 being juxtaposed close to each other in a circular manner. That is, the aforementioned upper end face 2a serves as a saddle face 2a, and the ring 9 is disposed on the saddle 2a in a manner to contact an inner face 9i thereof with the saddle face 2a. According to the present invention, the ring 9 is a single-layered belt-like annular member made of elastic material such as rubber, resin or the like having predetermined flexibility or bendability.

Figure 7:
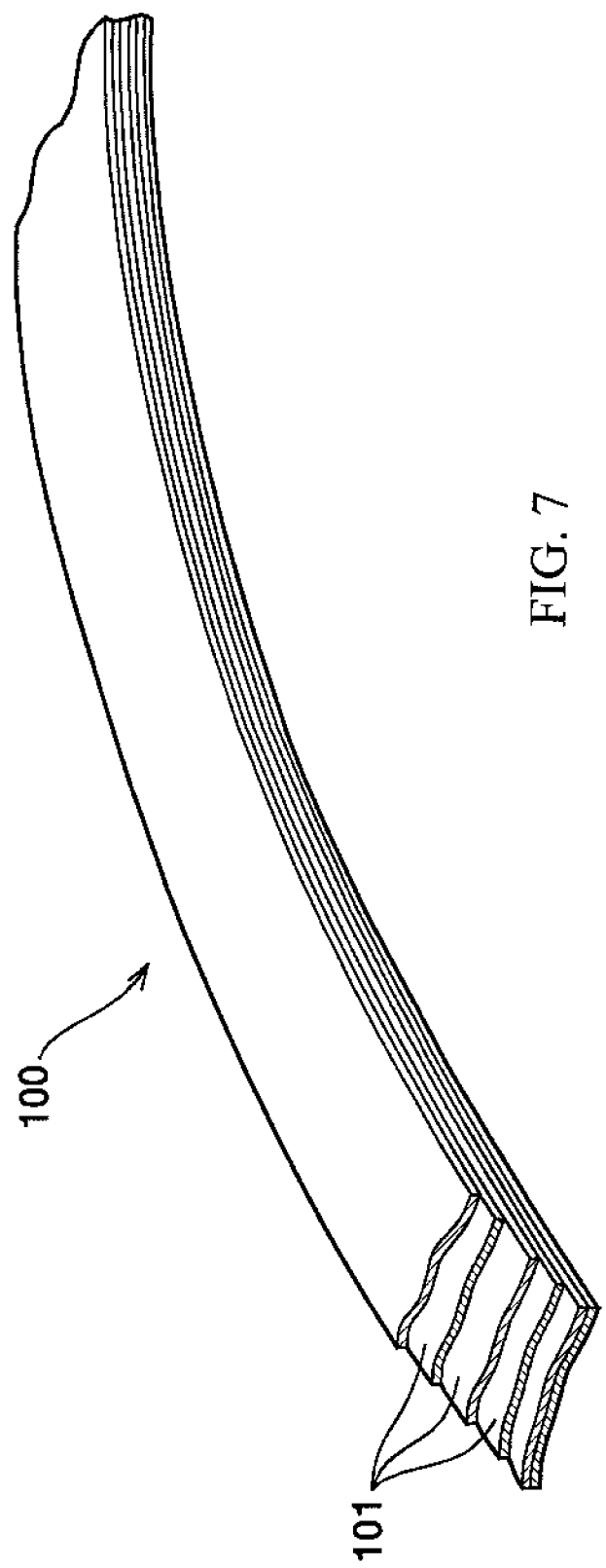
FIG. 7 is a view schematically showing an example of a conventional layered ring used in the push type driving belts of prior art.

According to the prior art, for example, a multilayered ring 100 shown in FIG. 7 is used to form a conventional push type driving belt together with a plurality of elements. As shown in FIG. 7, the conventional multilayered ring 100 is formed by overlapping a plurality of thin belt member 101 made of metal (as will be called a single-layered ring) in a radial (or thickness) direction. The single-layered rings 101 are kept to be overlapped by a tension of the single-layered ring 101 itself, and a friction between the single-layered rings 101. Therefore, the multilayered ring 100 has a total strength of strengths of the single-layered rings 101 while maintaining flexibility or bendability of the thin metal single-layered ring 101.

However, as described, the conventional multilayered ring 100 is formed by merely overlapping the single-layered rings 101. That is, the single-layered rings 101 are allowed to move relatively. Therefore, a slippage among the single-layered rings 101 may occur when transmit the torque. More specifically, a slippage is caused inevitably between inner and outer rings 101 by a difference in frictions and moments therebetween, on the occasion of transmitting power by the assembled transmission belt. Therefore, a power loss is caused by such inevitable slippage of each single-layered ring 101, and power transmission efficiency of the driving belt is thereby degraded.

In order to avoid the above-explained disadvantage, the ring 9 made of elastic material is used in the driving belt B of the present invention instead of the above-explained multilayered ring 100. Since the elastic material is used to form the ring 9, the ring 9 can be formed into a monolithic annular member. That is, the number of layers of the ring 9 in its thickness direction is one layer. Therefore, unlike the conventional multilayered ring 100, a slippage will not occur inside of the ring 9 even when the driving belt B is driven. For this reason, the power transmission efficiency of the driving belt B can be improved in comparison with that of the conventional driving belt using the multilayered ring 100.

In addition, the single layered ring 9 may also be made of material other than rubber and resin, which is sufficiently flexible and bendable to be applied to the pulleys smoothly but strong enough to achieve a required strength of the driving belt B. For example, the ring 9 may also be formed using complex material composed of core material such as a fiber and a metal wire, and a base material such as rubber and resin.

As described, the driving belt B is formed by fastening the plurality of elements 1 arranged in a circular manner using the ring 9, and the driving belt B thus assembled is applied to the drive and driven pulleys 5. In case the drive pulley 5 is driven, the driving belt B applied to those pulleys 5 transmits the torque ceaselessly. During the situation in which the driving belt B is thus transmitting the torque, some of the elements 1 around the pulleys 5 are spread like a fan. That is, the elements 1 around the pulleys 5 have to be contacted tightly in this situation. For this purpose, as illustrated in FIGS. 1 and 2, a thickness of the element 1 is thinned at its lower portion (that is, at the portion close to the rotational center of the pulley 5).

Figure 2:
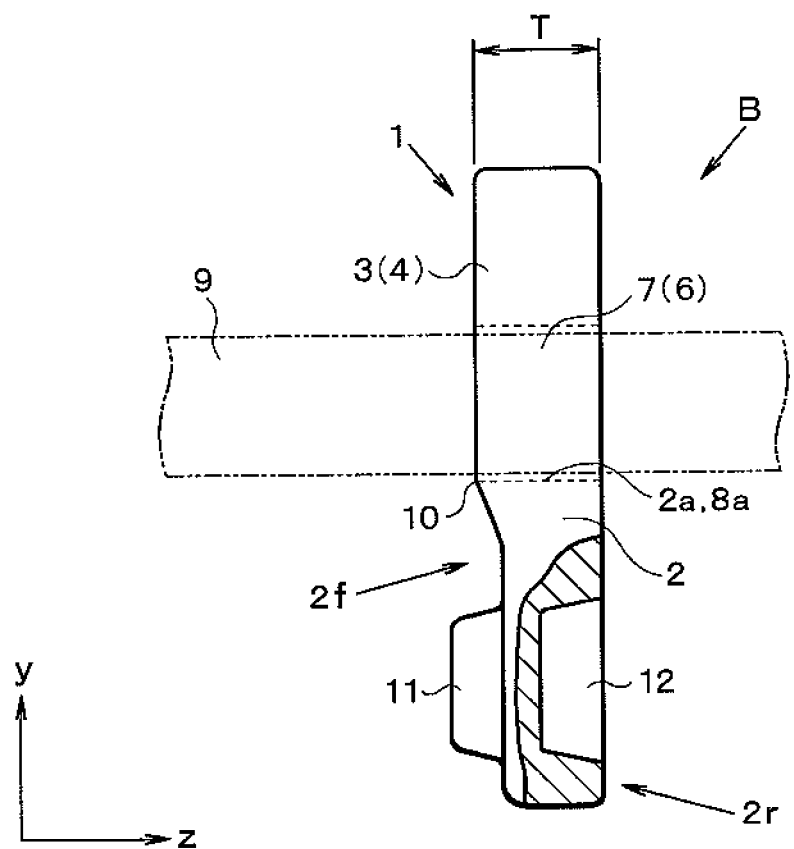
FIG. 2 is a partial side sectional view showing a side section of the element of the push type driving belt according to the present invention.

Specifically, a portion of a front face 2f (i.e., the left face in a direction of z-axis in FIG. 2) of the main body 2 lower than the saddle face 2a in the vertical direction of the element 1 is thinned (i.e., in the direction of y-axis in FIGS. 1 and 2). Therefore, the elements 1 around the pulleys 5 being spread like a fan, in other words, the elements 1 juxtaposed in a curved portion of the driving belt B around the pulleys 5 are contacted with each other at a boundary portion where the thickness of the element is thus changed. That is, an edge of the boundary portion serves as a rocking edge 10.

The saddle face 2a of the element 1 is contacted with the ring 9 fastening the elements 1. Therefore, a contact pressure therebetween is increased in case the driving belt is transmitting the torque. Meanwhile, when the elements 1 moving ahead in a straight region enter into the groove of the pulley 5 and oscillated in the fan-like fashion, the ring 9 slides on the saddle face 2a and this will result in a generation of large frictional force. In this situation, if a vertical distance between the saddle face 2a and the rocking edge 10 is long, a moment resulting from such frictional force is increased. Consequently, a slippage between the ring 9 and the saddle face 2a is induced. In this case, frictional loss is increased when the driving belt B is driven, and transmission efficiency of the driving belt B is thereby degraded.

In order to avoid the above-explained disadvantage, in the driving belt B, the rocking edge 10 is formed on the front face 2f at the same level or substantially same level as the saddle face 2a in the vertical direction of the element 1. Therefore, according to the present invention, the moment resulting from the frictional force between the ring 9 and the saddle face 2a can be reduced as small as possible. For this reason, the frictional loss can be reduced when the driving belt B is driven so that the power transmission efficiency of the driving belt B can be improved.

A boss 11 and a hole 12 are respectively formed on each face of the main body 2 at the width center of the element 1. Specifically, as shown in FIG. 2, the boss 11 of circular truncated cone is formed on the front face 2f of the main body 2. Meanwhile, the bottomed cylindrical hole 12 to which the boss 11 of the adjoining element is inserted loosely is formed on a rear face 2r (that is, the right face in the direction of z-axis in FIG. 2). Therefore, the elements 1 can be kept in line within a straight region of the driving belt B where the element 1 is not being contacted with the pulley 5.

Thus, both of the boss 11 and the hole 12 are formed the element 1 in an inner circumferential side of the rocking edge 10 (i.e., lower side in FIGS. 1 and 2). In addition, the thickness of the element 1 is thinned at the portion on which the boss 11 and the hole 12 are formed, and thickened at an outer circumferential side of the rocking edge 10 (i.e., at an upper side in FIGS. 1 and 2). Therefore, when the ring 9 is pulled, the elements 1 juxtaposed in the straight region of the ring 9 are contacted with each other at the portion where the thickness thereof is thicker, and in this situation, the boss 11 is inserted into the hole 12 of the adjoining element 1. Meanwhile, the elements 1 in the curved region of the ring 9 are spread like a fan and contacted with each other at the rocking edge 10.

Thus, the elements 1 can be aligned vertically and horizontally by inserting the boss 11 into the hole 12 of the adjoining element 1 in the straight region of the driving belt B. Therefore, chattering of the driving belt B can be prevented so that a power transmission unit using the driving belt B can be driven smoothly.

In order to prevent wear of only one of the side faces 9a and 9b of the ring 9 by centering the ring 9 widthwise in the recess 8 of the element 1, the driving belt B of the present invention is provided with inclined faces 13 and 14. The inclined faces 13 and 14 may be formed not only on the side faces 9a and 9b of the ring 9 but also on the inner walls 6a and 7a of the columns 6 and 7. In the example shown in FIG. 1, the inclined faces 13 and 14 are formed on the side faces 9a and 9b of the ring 9.

Specifically, the inclined face 13 is formed on the side face 9a, and the inclined face 14 is formed on the side face 9b plane symmetrically across a width center plane C of the driving belt B. Those inclined faces 13 and 14 are inclined in a manner to increase a distance between the side faces 9a and 9b across the center plane C, from an outer circumferential side toward an inner circumferential side of the driving belt B. That is, a cross-sectional shape of the ring 9 in the direction perpendicular to a length direction thereof is an isosceles trapezoid, in which an inner circumferential face 9i of the ring 9 as a lower base is longer than an outer circumferential face of the ring 9 as an upper base.

Figure 6:
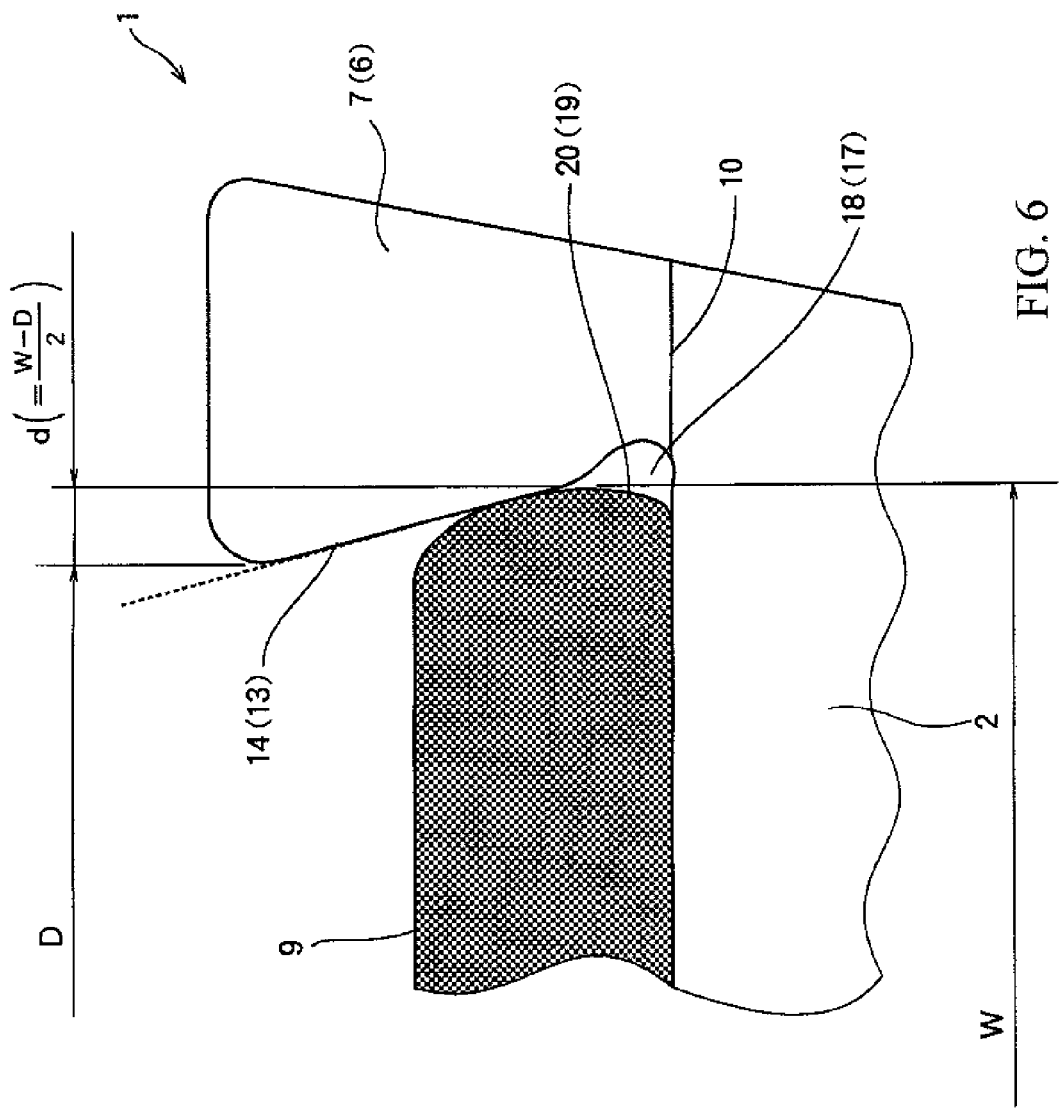
FIG. 6 is an enlarged view schematically showing another example of the inclined face and the contact face of the push type driving belt according to the present invention.

The driving belt B of the present invention comprises contact faces 15 and 16. The contact faces 15 and 16 may also be formed not only on the side faces 9a and 9b of the ring 9 but also on the inner walls 6a and 7a of the columns 6 and 7. In the example shown in FIG. 1, the contact face 15 is formed on the inner wall 6a, and the contact face 16 is formed on the inner wall 7a. Alternatively, the contact faces 15 and 16 may also be formed into curved faces. An example of contact curved faces 19 and 20 is shown in FIG. 6 to be described later.

Figure 3:
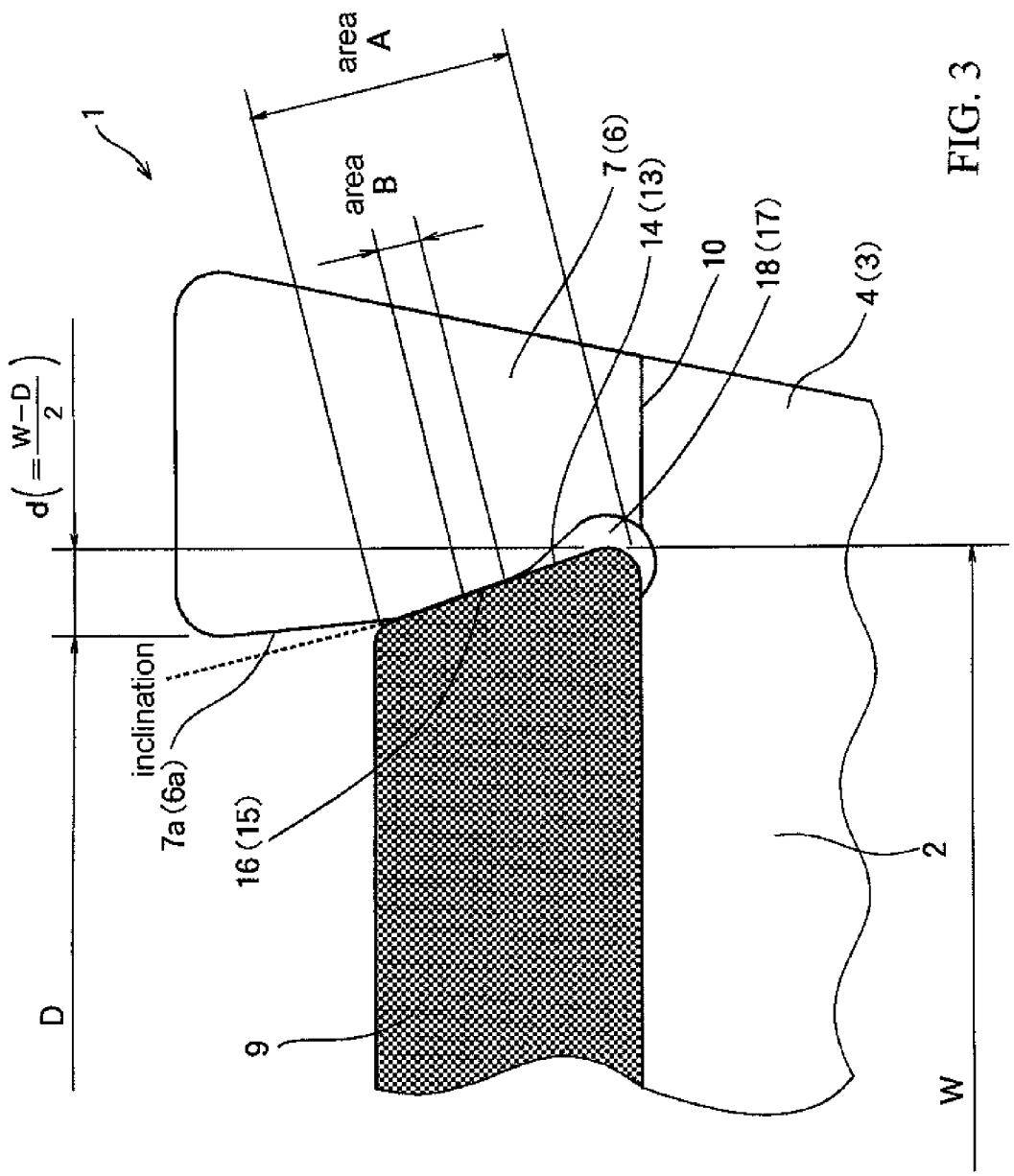
FIG. 3 is an enlarged view schematically showing an example of the inclined face and the contact face of the push type driving belt according to the present invention.

An inclination of contact face 15 of the inner wall 6a is identical to that of the inclined face 13 of the ring 9, and an inclination of contact face 16 of the inner wall 7a is identical to that of the inclined face 14 of the ring 9. However, a contact area of the contact face 15 is smaller than an area of the inclined face 13 per thickness of the element 1, and a contact area of the contact face 16 is smaller than an area of the inclined face 14 paper thickness of the element 1. Specifically, as shown in FIG. 3 in an enlarged scale, an area B of the contact face 16 (or 15) of the inner wall 7a (or 6a) is smaller than an area A of the inclined face 14 (or 13) of the ring 9 thickness of the element 1.

Here, a definition of the "thickness" of the element 1 is the maximum thickness of the element 1 which is not thinned, as represented by T in FIG. 2. That is, as can be seen from FIG. 2, the maximum thickness T of the element 1 is a thickness of a portion of the outer circumferential side of the rocking edge 10.

Therefore, in case the ring 9 is fitted into the recess 8 of the element 1, the inclined faces 13 and 14 are contacted individually with the contact faces 15 and 16. As described, the inclinations of the contact face 16 (or 15) and the inclined face 14 (or 13) being opposed to each other are identical to each other. Therefore, a width of the ring 9, and dimensions and configuration of each part of the element 1 are adjusted to contact the contact faces 15 and 16 individually with the inclined faces 13 and 14 under the situation where the ring 9 is held in the recess 8.

Specifically, a total width W of the ring 9, that is, the maximum width W of the inner face 9i of the ring 9, and an opening width D of the recess 8, that is, the shortest distance D between the inner walls 6a and 7a of the opening end side of the recess 8, are adjusted in a manner to contact the contact face 15 and 16 individually with the inclined faces 13 and 14 face-to-face.

Since both of the inclined faces 13 and 14 are thus tapered, the ring 9 can be positioned at the width center in the recess 8 by a wedge action of the tapered faces. Therefore, the ring 9 can be prevented from being contacted with the contact face 15 or 16) of the inner wall 6a or 7a only at one of the inclined faces 13 and 14 thereof. In other words, a load will not be applied to only one of the inclined faces 13 and 14 of the ring 9.

As also described, under the situation in which the ring 9 is held in the recess 8 of the element 1, the contact area between the contact face 16 (or 15) and the inclined face 14 (or 13) is smaller than the area of the inclined face 14 (or 13) per thickness of the element 1. This means that the contact area between the side face 9a (or 9b) of the ring 9 and the inner wall 6a (or 7a) of the recess 8 is reduced so that the friction drag at the contact portion between the ring 9 and the element 1 can be decreased. Therefore, a friction loss and a wear of the ring 9 can be prevented or avoided.

Figure 4:
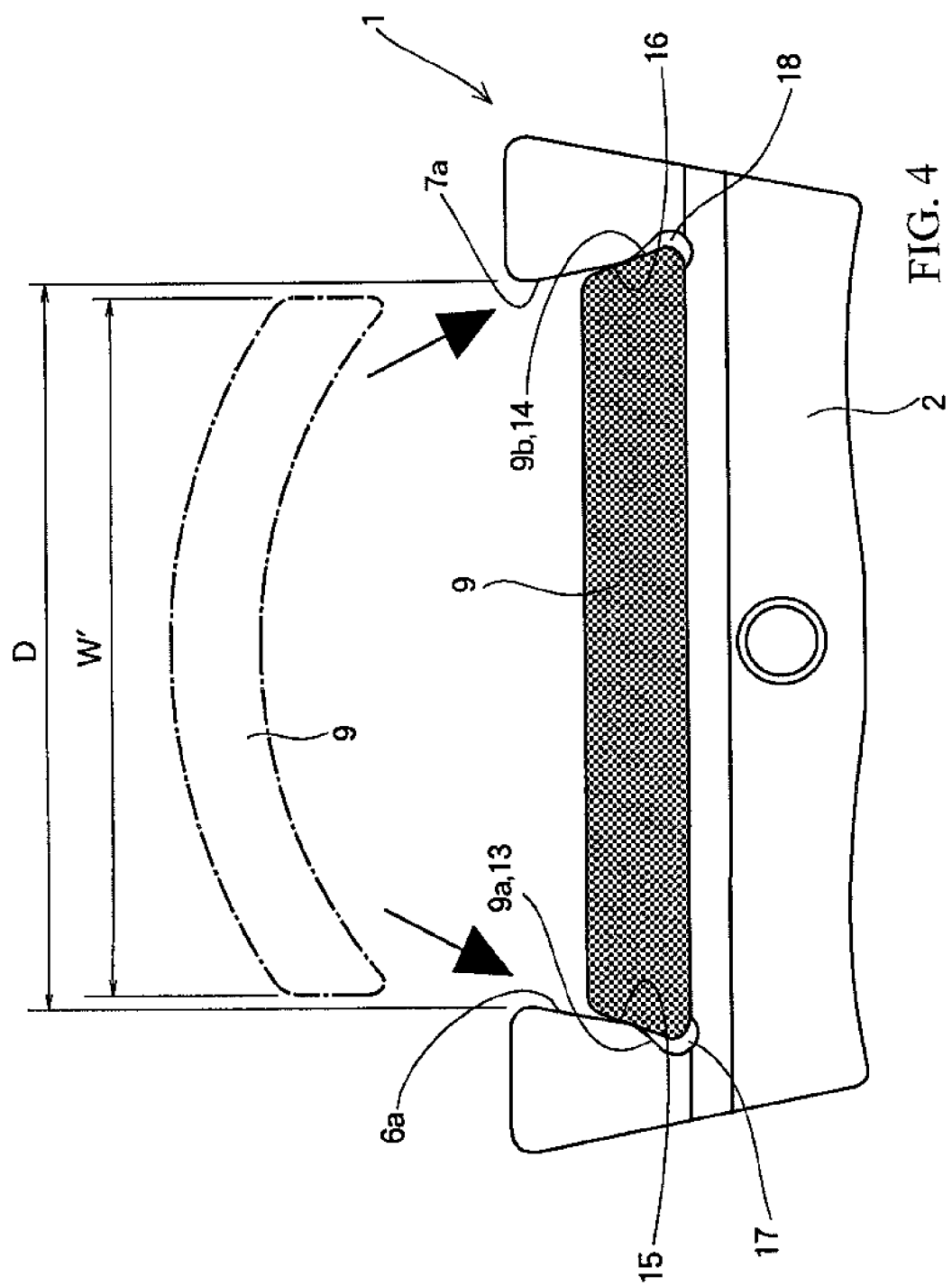
FIG. 4 is a view schematically showing a procedure for inserting the ring into the recess of the element according to the push type driving belt of the present invention.

The aforementioned opening width D of the recess 8 is narrower than the maximum width W of the ring 9. Specifically, as shown in FIG. 3 in an enlarged scale, the opening width D of the recess 8 is shorter than the maximum width W of the ring 9 in the total amount of a distance d of each side (i.e., d=(W−D)/2). As described, the ring 9 is formed of flexible and bendable elastic material. Therefore, as shown in FIG. 4 for example, the maximum width W of the ring 9 can be reduced to a width W', which is shorter than the opening width D of the recess 8, by bending the ring 9 in a manner to protrude the width center of the ring 9 toward the outer circumferential side of the driving belt B.

That is, the ring 9 can be inserted into the recess 8 of the element 1 through the opening of the recess 8 by thus bending the ring 9. Then, the ring 9 thus bent is returned to an original configuration thereof in the recess 8. Consequently, the inclined faces 13 and 14 of the ring 9 are individually contacted with the inner walls 6a and 7a of the recess 8 to be held in the recess 8. Therefore, the ring 9 will not be detached from the recess 8, that is, the elements 1 can be fastened by the ring 9 certainly.

In addition, according to the driving belt B of the present invention, a relief area 17 is formed at a corner between the inner wall 6a and the saddle face 2a, and a relief area 18 is formed at a corner between the inner wall 7a and the saddle face 2a. Therefore, in case the ring 9 held in the recess 8 is deformed widthwise, portions of the ring 9 expanded widthwise are housed in the relief area 17 and 18. For this purpose, the relief areas 17 and 18 are formed by rounding the corner between the inner wall 6a and the saddle face 2a, and the corner between the inner wall 7a and the saddle face 2a.

Specifically, as shown in FIG. 5, if a load is applied to the ring 9 held in the recess 8 in the thickness direction toward the inner circumferential side, the ring 9 is elastically deformed to be flattened. Consequently, the side faces 9a and 9b of the ring 9 are expanded widthwise. Normally, the ring 9 is held in the recess 8 while contacting the side faces 9a and 9b thereof, that is, while contacting the inclined faces 13 and 14 with the inner walls 6a and 7a. Therefore, in case the ring 9 in the recess 8 is deformed elastically to be expanded widthwise, both of the contact pressures between the inclined face 13 and the inner wall 6a, and between the inclined face 14 and the inner wall 7a are increased.

However, according to the driving belt B of the present invention, the relief area 17 is formed at the corner between the inner wall 6a and the saddle face 2a, and the relief area 18 is formed at the corner between the inner wall 7a and the saddle face 2a. Therefore, even if the ring 9 is expanded widthwise and the side faces 9a and 9b of the ring 9 are thereby pushed onto the inner walls 6a and 7a, the expanded portions of the side faces 9a and 9b are individually inserted into the relief areas 17 and 18. For this reason, the contact pressure between the inclined face 13 and the inner wall 6a, and the contact pressure between the inclined face 14 and the inner wall 7a will not be increased excessively. As a result, a friction loss at the contact portion between the side face 9a of the ring 9 and the inner wall 6a of the recess 8, and a friction loss at the contact portion between the side face 9b of the ring 9 and the inner wall 7a of the recess 8 can be prevented or avoided. In addition, the ring 9 will not be worn only at one of the side faces 9a and 9b thereof.

A shape, a dimension, and a position of the relief area 17 or 18 may be determined arbitrarily in accordance with a shape and a dimension of the ring 9, a hardness of material of the ring 9, a shape and a dimension of the recess 8, assumed load and stress etc.

In the example thus has been explained, the inclined faces 13 and 14 are formed individually on the side faces 9a and 9b of the ring 9, and the contact face 15 and 16 to be contacted with the inclined faces 13 and 14 are formed individually on the inner walls 6a and 7a of the recess 8. However, according to the driving belt B of the present invention, it is also possible to form the inclined faces 13 and 14 on the inner walls 6a and 7a, and to form the contact faces 15 and 16 individually on the side faces 9a and 9b.

Alternatively, according to the driving belt B of the present invention, contact curved faces 19 and 20 may be formed individually on the side faces 9a and 9b of the ring 9 or on the inner walls 6a and 7a of the recess 8, instead of the aforementioned contact faces 15 and 16. Specifically, in the example shown in FIG. 6, the inclined faces 13 and 14 are formed individually on the inner walls 6a and 7a of the recess 8, and the contact curved faces 19 and 20 are formed individually on the side faces 9a and 9b of the ring 9.

More specifically, according to the example shown in FIG. 6, the inclined face 13 is formed on the inner wall 6a of the recess 8, and the inclined face 14 is formed on the inner wall 7a plane symmetrically across a width center plane C of the driving belt B. Those inclined faces 13 and 14 are inclined in a manner to increase a distance therebetween from an outer circumferential side toward an inner circumferential side of the driving belt B.

In the example shown in FIG. 6, the contact curved face 19 is formed on the side face 9a of the ring 9, and the contact curved face 20 is formed on the side face 9b of the ring 9. Specifically, as shown in FIG. 6, the contact curved face 20 (or 19) has a curvature whose facing surface is parallel to the inclined faces 14 (or 13) of the recess 8. Therefore, under the situation in which the ring 9 is held in the recess 8, the inclined face 14 (or 13) formed on the inner wall 7a (or 6a) is contacted with the contact curved face 20 (or 19) to be congruent with the facing surface of the contact curved faces 20 (or 19). In other words, according to the example shown in FIG. 6, the contact curved face 20 (or 19) is formed on the side face 9b (or 9a) of the ring 9 to have a curvature whose curvature radius is perpendicular to the inclination of the inclined face 14 (or 13).

Thus, according to the example shown in FIG. 6, the contact curved faces 19 and 20 of the ring 9 are individually contacted with the inclined faces 13 and 14 formed on the inner walls 6a and 7a, under the situation in which the ring 9 is fitted in the recess 8. As described, the inclined face 13 and 14 are individually formed to be congruent with the facing surfaces of the contact curved faces 19 and 20 when contacted therewith. Therefore, the contact curved faces 19 and 20 can be contacted individually with the inclined faces 13 and 14 linearly or within a relatively narrow area under the condition where the ring 9 is held in the recess 8, by arbitrarily adjusting the width of the ring 9, and the shape and the dimension of the element 1.

Thus, according to the example shown in FIG. 6, the inclined faces 13 and 14 of the recess 8 also serve as the tapered guide faces. Therefore, the ring 9 can be positioned at the width center in the recess 8 by a wedge action of the tapered faces. For this reason, the ring 9 can be prevented from being contacted with the inner wall 6a or 7a only at one of the side faces 9a and 9b thereof. In other words, a load will not be applied to only one of the side faces 9a and 9b of the ring 9.

According to the example shown in FIG. 6, in theory, the contact curved face 20 (or 19) is contacted with the inclined faces 14 (or 13) linearly under the condition where the ring 9 is held in the recess 8. This means that the contact area between the inclined face 14 (or 13) and the contact curved face 20 (or 19) is much smaller than the area of the inclined face 14 (or 13) even if the ring 9 formed of the elastic element is deformed elastically. Therefore, according to the example shown in FIG. 6, a friction loss and a wear of the ring 9 at the contact portion between the ring 9 and the element 1 can also be prevented or avoided.

Thus, according to the present invention, the ring 9 for fastening the elements 1 to form the driving belt B is a single layered monolithic annular member, and the ring 9 is made of elastic material whose rigidity is lower than the material of the element 1 such as rubber, resin, etc. Therefore, a transmission loss resulting from an internal slippage of the ring 9 will not occur in the driving belt B being driven so that the power transmission efficiency of the driving belt B can be improved.

As described, according to the driving belt B of the present invention, the inclined faces 13 and 14 are formed individually on the side faces 9a and 9b of the ring 9 in a manner to form a cross sectional shape of the ring 9 symmetrical widthwise. Meanwhile, the contact face 15 and 16, or the contact curved face 19 and 20 to be contacted individually with the inclined faces 13 and 14 are formed on the inner wall 6a and 7a of the recess 8 for holding the ring 9 therein. Alternatively, according to the driving belt B of the present invention, the inclined faces 13 and 14 are formed individually on the inner wall 6a and 7a of the recess 8 in a manner to form the recess 8 symmetrical widthwise. In this case, the contact face 15 and 16 or the contact curved face 19 and 20 are formed individually on the side faces 9a and 9b of the ring 9.

Therefore, according to the driving belt B of the present invention, the inclined faces 13 and 14 formed on the ring 9 or the element 1 serve as the guide faces. For this reason, the ring 9 held in the recess 8 can be positioned at the width center of the recess 8 by a wedge action of the inclined faces 13 and 14.

As also described, an area of the contact face 15 or 16, or an area of the contact curved face 19 or 20 formed to be opposed to the inclined face 13 or 14 under the condition in which the ring 9 is held in the recess 8 is smaller than the area of the inclined face 13 or 14 per thickness of the element 1. Therefore, the contact area between the contact face 15 or 16, or the contact curved face 19 or 20 and the inclined face 13 or 14 is smaller then the area of the inclined face 13 or 14 per thickness of the element 1. For this reason, the ring 9 can be prevented from being contacted with the inner wall 6a or 7a only at one of the side faces 9a and 9b thereof. In other words, a load will not be applied to only one of the side faces 9a and 9b of the ring 9. Consequently, a friction loss and an uneven wear of the ring 9 at the contact portion between the ring 9 and the element 1 can also be prevented or avoided.

In addition, the present invention should not be limited to the examples thus far explained. For example, in the above-explained examples, the push-type driving belt according to the present invention is applied to a belt-type continuously variable transmission. However, the push-type driving belt according to the present invention can also be applied to other kinds of belt-type transmission mechanisms using a belt and pulleys.

The invention claimed is:

1. A push-type driving belt, comprising:
a plurality of plate elements, in which a recess opening toward a diametrically outer circumferential side of the belt is formed in a width center thereof; and
a flat ring, which is formed of single layer in itsa thickness direction using elastic material, and which is fitted into the recess of the element to fasten the elements juxtaposed in a circular manner;
an inclined face, which is formed on each opposing side face of athe flat ring symmetrically across a width center plane of the belt, wherein the inclined faces are inclined so that a distance between the opposing side faces increases in a direction from an outer circumferential side toward an inner circumferential side of the ring; and
a contact face formed on each inner wall of a width end of the recess, the contact face having an inclination identical to that of the inclined face of the ring and having an area smaller than an area of the inclined face of the ring.

2. A push-type driving belt, comprising:
a plurality of plate elements, in which a recess opening toward a diametrically outer circumferential side of the belt is formed in a width center thereof; and
a flat ring, which is formed of single layer in a thickness direction using elastic material, and which is fitted into the recess of the element to fasten the elements juxtaposed in a circular manner;
an inclined face, which is formed on each inner wall of a width end of the recess symmetrically across a width center plane of the belt, wherein the inclined faces are inclined and facing each other so that a distance between the inclined faces of the each of the plate elements increases in a direction from an outer circumferential side toward an inner circumferential side of the element; and
a contact face formed on each side face of the ring so as to face the inclined faces of the element, the contact faces having an inclination identical to that of the inclined faces.

3. The push-type driving belt as claimed in claim 1, wherein:
the inclined face includes a flat plane, which is inclined in a manner to increase a distance from the width center plane of the belt from a diametrically outer circumferential side toward a diametrically inner circumferential side of the belt.

4. The push-type driving belt as claimed in claim 1, further comprising:
a relief area, which is formed on the inner wall, and in which an expanded portion of the ring is housed so that the ring is configured to elastically deform and be expanded widthwise.

5. The push-type driving belt as claimed in claim 2, wherein:
the inclined face includes a flat plane, which is inclined in a manner to increase a distance from the width center plane of the belt from a diametrically outer circumferential side toward a diametrically inner circumferential side of the belt.

6. The push-type driving belt as claimed in claim 2, further comprising: a relief area, which is formed on the inner wall, and in which an expanded portion of the ring is housed so that the ring is configured to elastically deform and be expanded widthwise.

7. The push-type driving belt as claimed in claim 3, further comprising: a relief area, which is formed on the inner wall, and in which an expanded portion of the ring is housed so that the ring is configured to elastically deform and be expanded widthwise.

8. The push-type driving belt as claimed in claim 5, further comprising: a relief area, which is formed on the inner wall, and in which an expanded portion of the ring is housed so that the ring is configured to elastically deform and be expanded widthwise.

* * * * *